United States Patent
Fert et al.

(10) Patent No.: US 6,795,502 B2
(45) Date of Patent: *Sep. 21, 2004

(54) VARIABLE BITRATE VIDEO CODING METHOD AND CORRESPONDING VIDEO CODER

(75) Inventors: Etienne Fert, Paris (FR); Daniel Kaiser, Kirch-Goens Butzbac (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 771 days.

This patent is subject to a terminal disclaimer.

(21) Appl. No.: 09/764,658

(22) Filed: Jan. 17, 2001

(65) Prior Publication Data

US 2003/0227970 A1 Dec. 11, 2003

Related U.S. Application Data

(63) Continuation of application No. 09/121,574, filed on Jul. 23, 1998, now Pat. No. 6,205,174.

(30) Foreign Application Priority Data

Jul. 29, 1997 (EP) .............................................. 97401823
May 26, 1998 (EP) .............................................. 98401247

(51) Int. Cl.$^7$ ................................................. H04N 7/32
(52) U.S. Cl. .................................. 375/240.03; 348/700
(58) Field of Search ........................ 375/240.01–240.07, 375/240.12–240.16, 240.24; 382/232, 236, 238, 239, 251; 348/699, 700; H04N 7/32

(56) References Cited

U.S. PATENT DOCUMENTS 6,205,174 B1 * 3/2001 Fert et al. .............. 375/240.03

* cited by examiner

*Primary Examiner*—Richard Lee

(57) ABSTRACT

A variable bitrate coding method includes an iterative process including a first analysis pass and a second prediction pass. Further, followed by a last control step for adjusting a stepsize with respect to a target bitrate. A picture re-arrangement step is also provided between the analysis and prediction steps of one iteration, in order to encode with an improved quality the picture sequence. This coding method is applicable to MPEG-2 encoders for storage media with limited capacity.

7 Claims, 6 Drawing Sheets

VARIABLE BITRATE VIDEO CODING METHOD AND CORRESPONDING VIDEO CODER

CROSS REFERENCE TO RELATED APPLICATIONS

This is a continuation of application Ser. No. 09/121,574, filed Jul. 23, 1998, now U.S. Pat. No. 6,205,174.

The present invention relates to a variable bitrate video coding method including an iterative process that comprises a first analysis step, for coding a bitstream corresponding to a picture sequence with a constant quantization stepsize, and a second prediction step, for predicting the quantization stepsize which must then be used to code said bitstream according to a predetermined target bit rate, and is followed by a final control step, for adjusting the stepsize with respect to said target bit rate. The invention also relates to a corresponding video coder allowing to carry out said method.

As described in the document << MPEG Video coding: a basic tutorial introduction >>, S. R. Ely, BBC Research and Development Report, BBC-RD-1996/3, pp.1–10, MPEG activities started in 1988 with the aim of defining standards for digital compression of video and audio signals. The first goal was to define a video algorithm for digital storage media such as the CD-ROM (Compact Disc Read-Only Memory), but the resulting standard was also applied in the Interactive CD system (CD-I). Allowing transmission and storage of picture data at bit rates in the range of 1 to 15 Mbits/s, this standard is based on a data compression achieved by using a block-based motion compensation for the reduction of the temporal redundancy and a discrete cosine transformation (DCT) for the reduction of the spatial redundancy.

With conventional CD standards such as CD-I and CD-ROM, the transmission bit rate is fixed and pictures can therefore only be coded at a constant bit rate. New standards such as the Digital Versatile Disc (DVD) allow for transmission of data at a variable bit rate (VBR): complex scenes can be coded at a higher bitrate than scenes containing less information, in order to maintain a constant quality.

An object of the invention is to propose a VBR video coding method allowing to obtain such a constant quality of the coded sequence, with a minimal bit rate of the encoder output bitstream.

To this end the invention relates to a VBR video coding method such as defined in the preamble of the description and which is moreover characterized in that it comprises, between the analysis and prediction steps of one iteration, a picture re-arrangement step.

Such a picture re-arrangement step preferably comprises in series a first scene change detection sub-step, a second allocation sub-step, and a third optimum placement sub-step.

In a preferred implementation, said scene change detection sub-step comprises a correlation operation, carried out between succeeding pictures of the sequence, and a decision operation, for indicating the possible occurrence of a scene change.

Another object of the invention is to propose a VBR video coder allowing to carry out said coding method.

To this end the invention relates to a variable bit rate video coder comprising a first coding branch, a second prediction branch, and a control circuit provided for carrying out the implementation of the following operations:
a coding operation of a bitstream corresponding to a picture sequence with a constant quantization stepsize;
a prediction operation, for an estimation of the quantization stepsize allowing to code said bitstream according to a specified target bitrate;
at least one repetition of said operations;
a final controlling operation, for adjusting the stepsize with respect to said target bitrate;
characterized in that said control circuit is provided for implementing, between the first coding operation and the first prediction operation, a picture re-arrangement operation.

The advantages of the invention will be now explained in a more detailed manner in relation with the following description and the accompanying drawings, in which.

Figure 13:
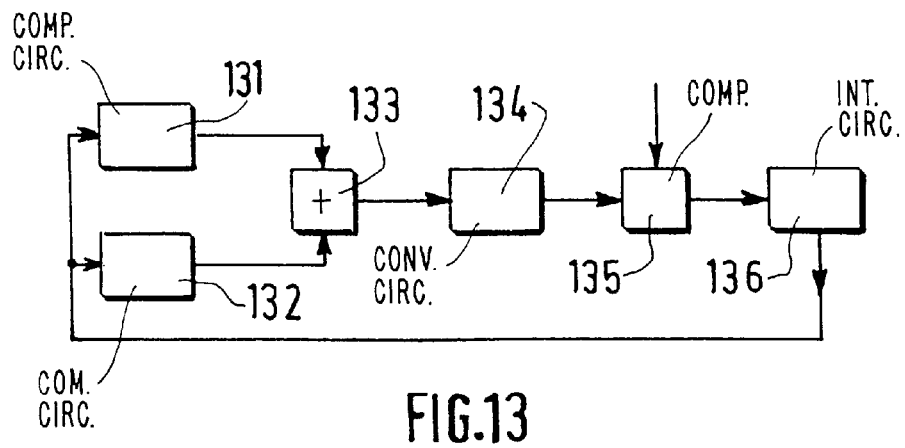
Figure 11:
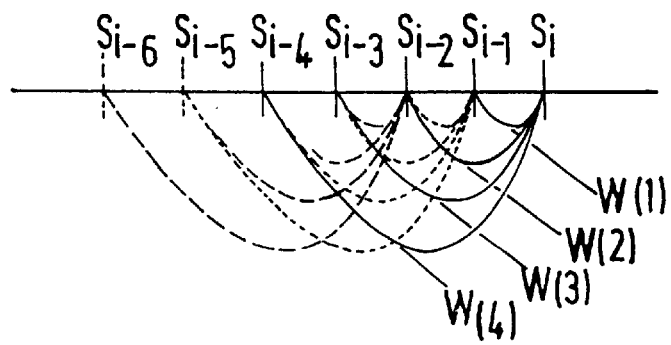
Figure 12:
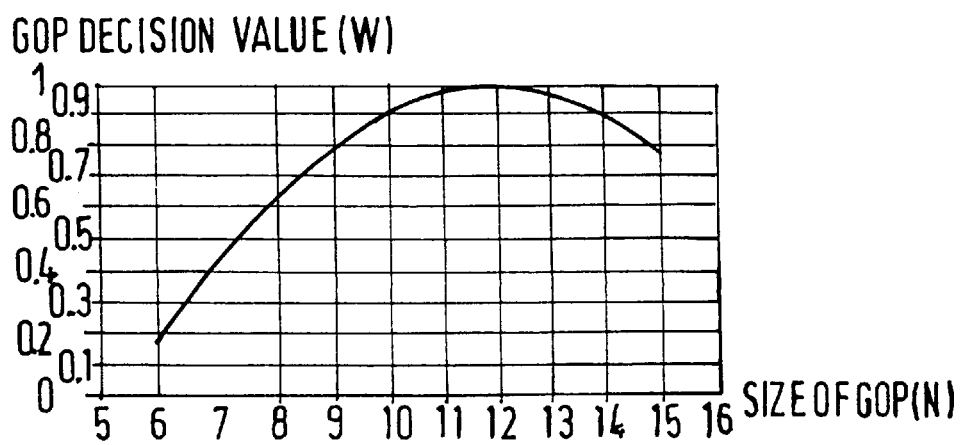

FIG. 11 gives the decision values of the Viterbi algorithm used to solve the problem of optimal allocation of groups of pictures (or GOPs);

FIG. 12 illustrates an example of weighting function for the GOP size (as weighting values are used to evaluate the size of the GOPs);

FIG. 13 shows a control loop used for the implementation of the final control step of said coding method.

Before describing the coding method according to the invention, some basic principles of the MPEG-2 video standard may be recalled. The flexibility of this standard, intended to support a wide range of possible applications, is obtained thanks to the definition of profiles and levels allowing to suit all of the application requirements. A profile is a subset of the MPEG-2 standard intended to support only the features needed by a given class of application, while a level defines a set of imposed constraints on parameters of the bitstream.

The basic steps of the MPEG-2 compression, applied to colour pictures consisting of three components (Y,U,V), concern pictures that are divided into small subsections, or macroblocks, themselves consisting of luminance and chrominance blocks. These steps are: motion estimation and compensation (based on 16 pixels×16 lines macroblocks), discrete cosine transformation (based on 8 pixels×8 lines blocks), run-length coding.

Three types of pictures are defined. Intra pictures (or I pictures) are coded without reference to other pictures, predictive pictures (or P pictures) are coded using a motion-compensated prediction from a past I or P picture, and bidirectional-predictive pictures (or B pictures) use both past and future I or P pictures for motion compensation. The motion information is given in the form of motion vectors obtained by implementation of a block-matching search (in which a large number of trial offsets are tested in the coder and the best one is selected on the basis of a measurement of the minimum error between the block being coded and the prediction).

Figure 1:
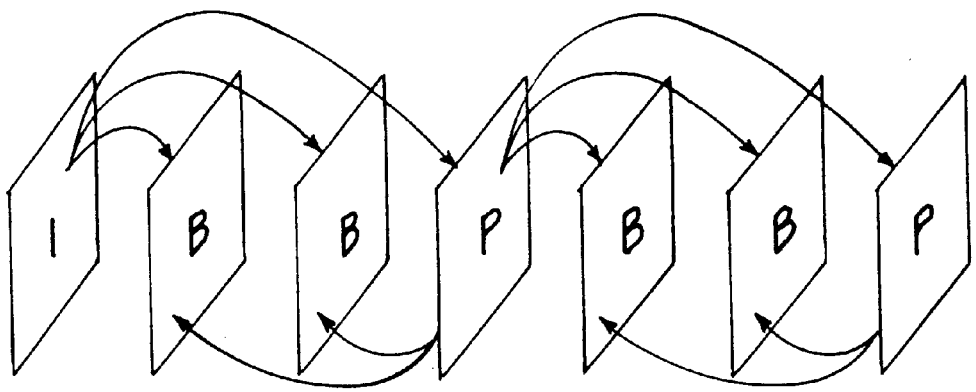
FIG. 1 shows some pictures of a group of pictures.

As indicated in FIG. 1 that illustrates how, on the basis of the motion vectors, the P and B pictures are defined, the different pictures typically occur in a repeating sequence which is termed, as said above, a group of pictures, or GOP, and consists of an I picture and all succeeding pictures until the next I picture occurs. A typical GOP is shown in display order in FIG. 2 (the black arrows correspond to forward predictions and the white ones to backward predictions, the sequences and the predictions repeating periodically) and in transmission order in FIG. 3 (P4, P7, I10, P13 designate the re-ordered frames), said orders being different to enable at the decoding side backward predictions from future pictures.

Figure 2:
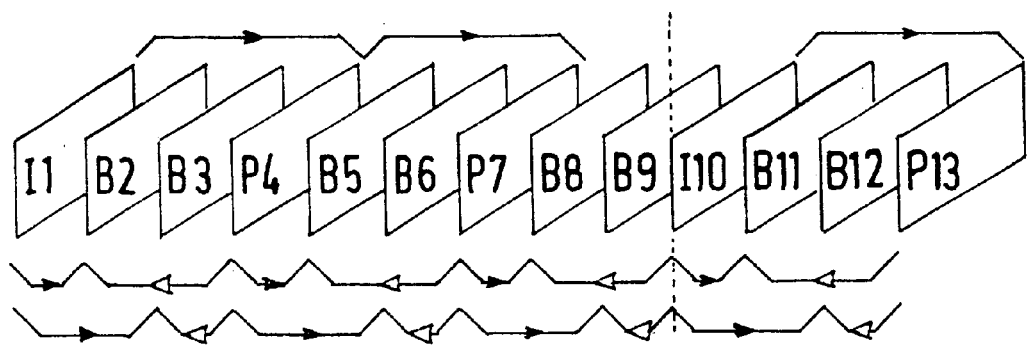
FIGS. 2 and 3 illustrate for such a typical group of pictures the difference between the display order of the pictures and their transmission order.
Figure 3:
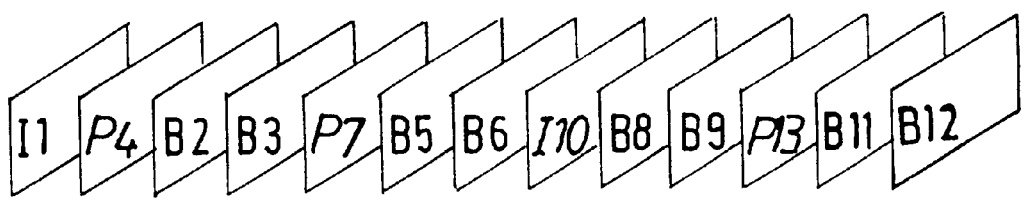

A regular GOP structure can be described with two parameters, N and M. The parameter N, defined as the size of a GOP, is, as shown in FIG. 2, the number of pictures of said GOP, i.e. the number of pictures between two I pictures plus one. The parameter M is the spacing of P pictures, or (which is the same) the number of adjacent B pictures plus one. In the illustrated example of FIGS. 1 to 3, M=3 and N=9. Obviously other combinations are possible:

| Picture display order | N | M |
|---|---|---|
| IPPPPPIPP | 6 | 1 |
| IBPBPBPBI | 8 | 2 |
| IBBPBBPBBPBBIBBP | 12 | 3 |

N and M being chosen independently from each other.

After a decision about the kind of macroblock compensation has been taken, the prediction error for each pixel of the concerned macroblock is obtained by subtracting the estimated macroblock from the original one. A DCT is then performed on the prediction error, for a block of 8×8 pixels (hence six DCT transforms are determined for each macroblock: four for the luminance component, two for the chrominance components), and the frequency components thus obtained are quantized. The quantization stepsize determines the bitrate and the distorsion of the decoded image: if the quantization is coarse, few bits are needed to code a picture, but the final quality is low, while, if the quantization stepsize is fine, many bits are needed to code the picture, but the quality is high. As the human eye is less sensible to the higher frequencies than to the lower ones, it is advantageous to use coarser quantizers for the high frequency components (in fact, in order to achieve the frequency dependent quantization, a weighting matrix is applied to a basic macroblock quantization parameter: a lot of coefficients, especially those at high frequencies, is equal to 0 after said weighted quantization).

Each block is then zigzag scanned and the obtained list is coded. The run-length coding is done by determining a pair (A, NZ) where A designates the number of consecutive zeros (0 to 63) and NZ the amplitude of the following non-zero coefficient.

A variable length code is then assigned to this pair (A,NZ), depending on the frequency of occurrence of this pair (a combination (A,NZ) which is common is assigned a short variable length code, whereas a pair which is less frequent is assigned a long one).

Figure 4:
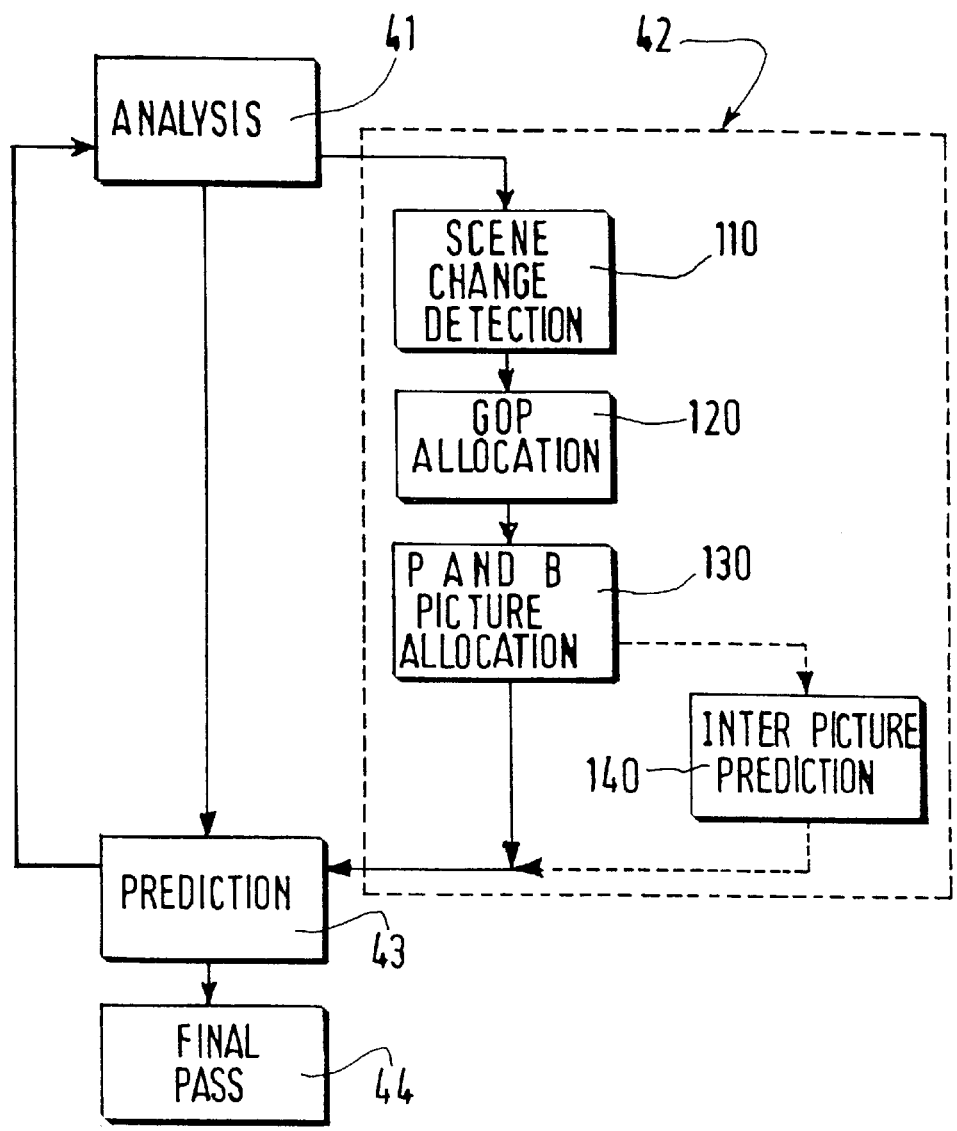
FIGS. 4 and 5 show respectively the main steps of the coding method according to the invention and a corresponding architecture of video coder allowing to implement said method.
Figure 5:
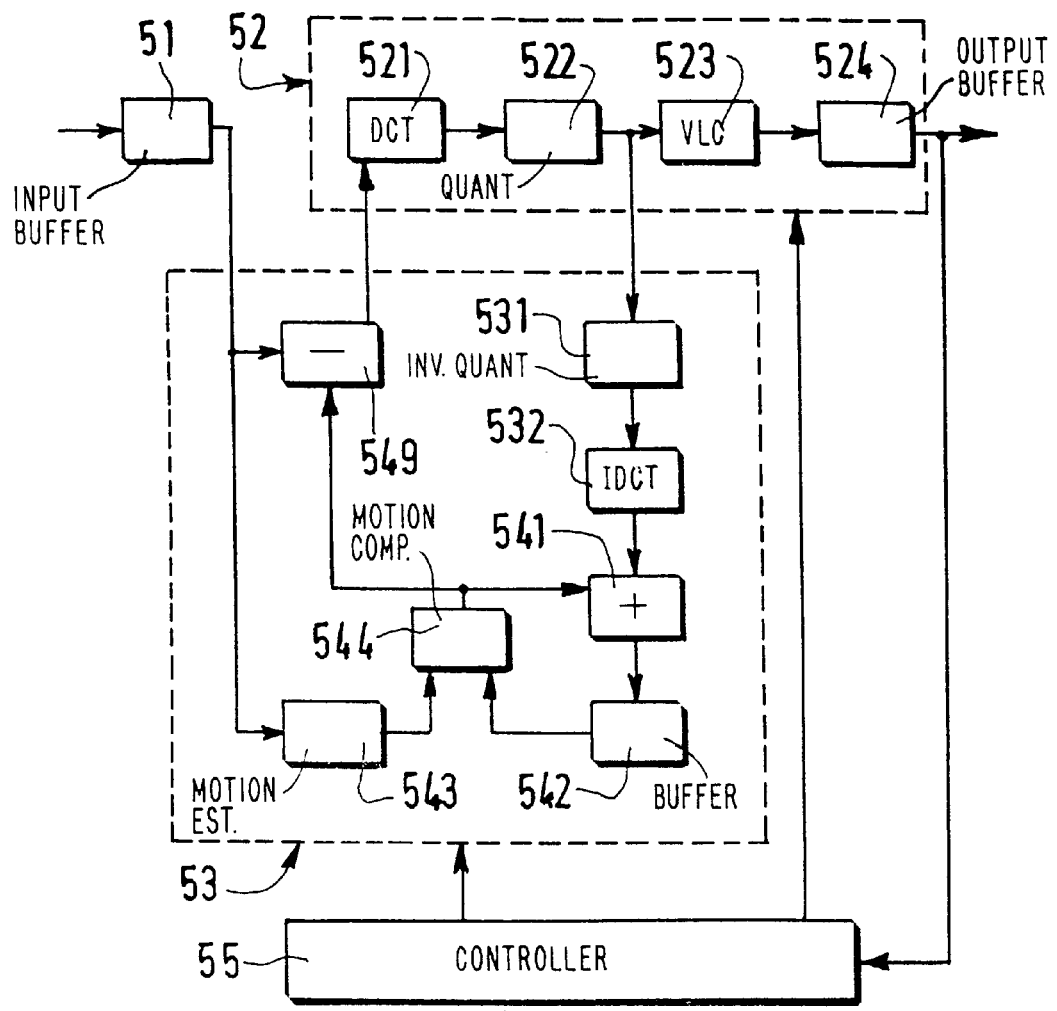

The functions hereabove described are summarized for example in the document << Hybrid extended MPEG video coding algorithm for general video applications >>, C. T. Chen and al., Signal Processing: Image Communication 5 (1993), pp.21–37, part 2.4, which includes the scheme of a generalized MPEG-2 coder. The aim of the VBR coding method now proposed is then to use the information that is gained from preceding coding steps carried out in several successive analysis passes to perform an adaptive allocation of the picture types, which allows to minimize the size of the final bitstream in order to fit exactly on a storage medium with a fixed capacity (like a DVD). A diagram of said method is given in FIG. 4, and an architecture of video coder with picture rearrangement allowing to implement said method is illustrated in FIG. 5.

The coding method is divided into four steps 41, 42, 43 and 44. The first step 41 is an analysis one, in which a picture sequence is coded with a constant quantization stepsize $Q_c$ (and therefore with a constant quality). At the end of this step, a regular MPEG-2 compliant bit stream has been generated, but the average bit rate of the whole sequence thus processed (i.e. the quotient of the total number of coded bits over the sequence by the total number of pictures in that sequence), unknown before the end of said step, does not fulfill the required constraint of a specific size of the bitstream.

The second step 42 is a picture re-ordering one, performed after the analysis step 41. This re-ordering step may be itself subdivided into three sub-steps 110 to 130. The task of optimizing the picture allocation can be considered as comprising two separate parts. The first one is the improvement of the placement of the I pictures, which is equivalent to an optimization of the GOP allocation, while the second one is the most efficient placement of B and P pictures.

The first and second sub-steps 110 and 120 constitute the first part of said optimizing task. It is clear that I pictures, that do not exploit the temporal correlation between successive pictures of a sequence, are the most costly ones in terms of bit rate. On the other hand, they are necessary to allow random access to a sequence, and random access is important for many applications. Moreover, since quick random access is often wanted, it must be taken care of that a given maximum distance between I pictures is not exceeded (for instance, at most 12 pictures). When a scene change occurs, the pictures before and after the cut (left and right pictures) are uncorrelated. The motion compensation is not well performed for the first P picture in the new scene, and its bit rate is therefore approximately that of an I picture. Such an I picture can then be placed instead of said P picture without an extra cost in bandwidth. The strategy for an optimal placement of I pictures must then allocate the I pictures at the beginning of a new scene whenever possible.

The first sub-step 110, which is a scene change detection sub-step, allows for such an allocation. In order to detect scene changes, the correlation of succeeding pictures of the sequence is examined (preferably after the motion compensation): if two adjacent pictures are almost uncorrelated, it is likely that a new scene begins with the second one. In a basic MPEG-2 coding process, several parameters give some information about the correlation between successive pictures:

the complexity of a P or B picture: the connection between complexity and correlation is however not always verified (a low bit rate being sometimes due to a high correlation with the reference picture or to a low intra complexity, with a totally black pictures, for instance);

a better estimation of the correlation (although more expensive in computation time) is obtained by comparing the macroblocks MB of a pictures with their reference macroblocks (always provided by the motion compensation unit, whatever the type of block coding: intra or inter): the comparison can be done by means of a computation of the squared-error distorsion d(MB), which is for example given by the relation (1):

$$d(MB) = \frac{1}{255} \sum_{i=0}^{i=255} (P(i) - M(i))^2 \qquad (1)$$

where P(i) is a pixel of the analyzed macroblock MB and M(i) is a pixel of the reference macroblock;
the motion estimation being macroblock-oriented, a picture is predicted using several motion compensation options:

| Picture type | Motion compensation option |
|---|---|
| I | Intra (ie no motion compensation) |
| P | Intra |
| P | Forward |
| P | Not compensated |
| B | Intra |
| B | Forward |
| B | Backward |
| B | Interpolated | and the motion compensation statistics may convey information about picture correlation: if most macroblocks are intra coded, the correlation with the reference picture(s) is low and vice-versa.

Figure 6:
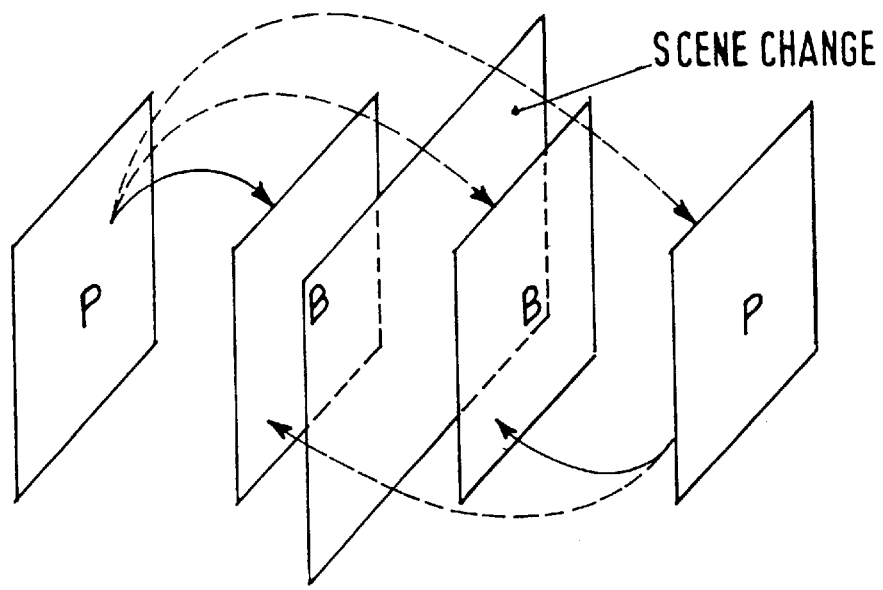
FIG. 6 shows some pictures and the associated motion vectors for a sequence with a scene change between two successive B pictures.

The implemented embodiment uses said motion compensation statistics for the detection of scene changes, in the case where only B pictures are used for instance, as seen in FIG. 6 which shows pictures and motion vectors for a sequence PBBP with a scene change illustrated between the two B pictures (broken arrows indicate that less macroblocks of the concerned reference picture are used to predict the dependent picture, the correlation being lower). As the scene cut occurs between the two B pictures, the first one uses almost only the preceding P picture as reference picture, since it is basically uncorrelated with the following P picture. Similarly, the second B picture is almost uncorrelated with the preceding P picture and uses almost only the following P picture as reference.

A scene change can be placed before, between, or after two adjacent B pictures, in a group of three pictures such as illustrated (PBB, or IBB). The table given hereunder shows, for the three possible positions of the scene cut, the motion compensation that is used by most macroblocks of the first B picture and by most macroblocks of the second picture:

| POSITION | FIRST PICTURE | SECOND PICTURE |
|---|---|---|
| before | backward | backward |
| between | forward | backward |
| after | forward | forward |

(the direction of the motion compensation being "seen" from the point of view of the B pictures).

To evaluate quantitatively the motion vector statistics mentioned hereabove, two detection coefficients DCL and DCR are computed (DC for "detection coefficient", L and R for "left" and "right", MC for "motion compensated"):

$$DCL = \frac{(\text{intra}) + (\text{backward } MC)}{(\text{forward}) + (\text{interpolated } MC)} \qquad (2)$$

$$DCR = \frac{(\text{intra}) + (\text{forward } MC)}{(\text{backward}) + (\text{interpolated } MC)} \qquad (3)$$

For P pictures, the detection coefficient can be similarly defined:

$$DCP = \frac{\text{intra } MC}{(\text{forward } MC) + (\text{not } MC)} \qquad (4)$$

Figure 9:
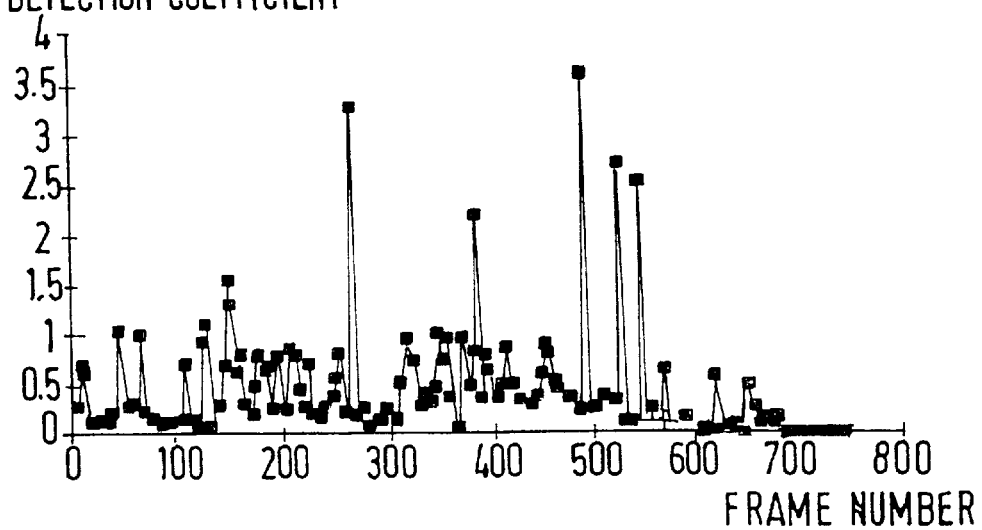
FIG. 9 shows values of a similar detection coefficient DCP for P pictures.
Figure 7:
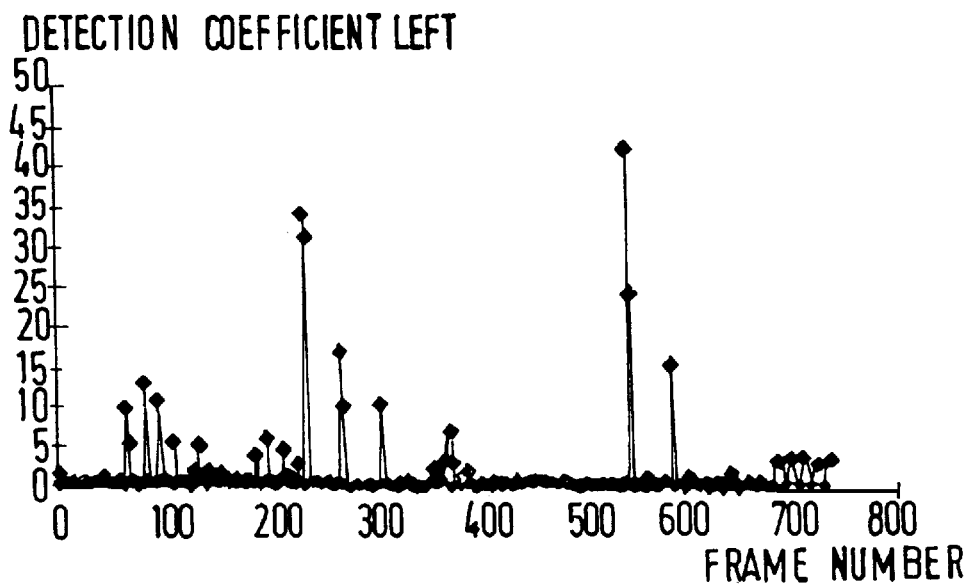
FIGS. 7 and 8 show values of two detection coefficients DCL and DCR computed in order to evaluate quantitatively the motion vector statistics used by the macroblocks of the B picture for the three possible positions of a scene cut with respect to the two B pictures of an IBBP or a PBBP group of pictures.
Figure 8:
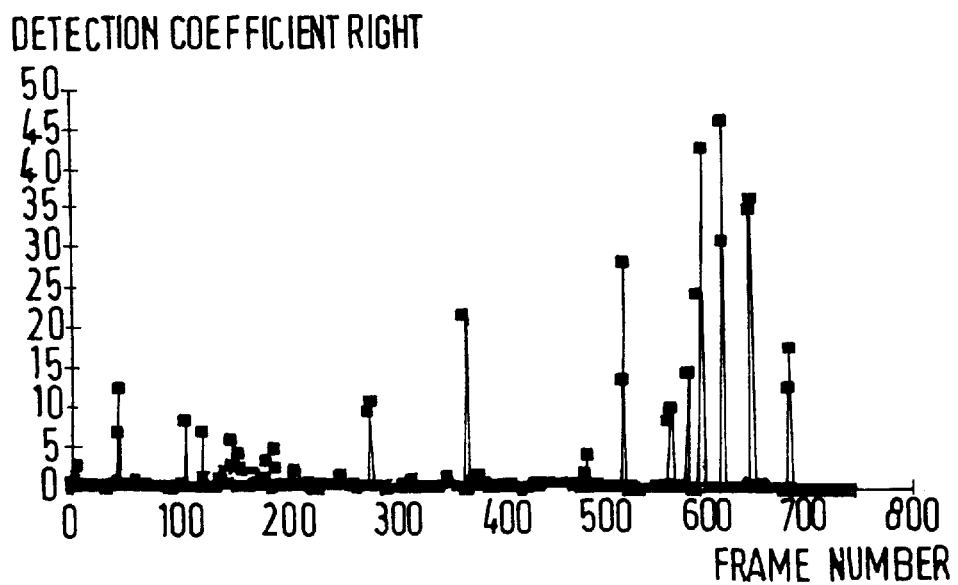

As shown in FIGS. 7 and 8 which indicate values of the left and right detection coefficients DCL and DCR for successive B pictures, scene cuts clearly correspond to spikes. Similarly, the detection coefficients DCP for P pictures are shown in FIG. 9 (obviously, the information conveyed by the motion vectors of P pictures is much less reliable than that provided by the B pictures).

In case (for example) of a scene change that occurs after the two B pictures, i.e. between the second B picture and the following reference picture (on the right side of said second B picture), few macroblocks of the analyzed B picture are backward compensated or interpolated, since the correlation between said B picture and the following reference picture is low, and a majority of them is intra or forward motion compensated: the value of the detection coefficient DCR is therefore high, whereas the value of the detection coefficient DCL is not increased (on the contrary, in case of a scene change on the left side of the first B picture, between the previous reference picture and said B picture, DCL has a high value and DCR remains small, while both DCL and DCR have a small value if no scene change occurs in the block of M pictures). In fact, in order to have a single, symmetric indicator of scene changes, the difference DDV between both detection values is computed, which yields:

$$DDV = DCL - DCR \qquad (5)$$

that is to say:

$$DDV = \qquad (6)$$
$$\frac{(\text{intra}) + (\text{backward } MC)}{(\text{forward}) + (\text{interpolated } MC)} - \frac{(\text{intra}) + (\text{forward } MC)}{(\text{backward}) + (\text{interpolated } MC)}$$

$$DDV = \frac{(NBMB \text{ per picture}) * (\text{backward } MC - \text{forward } MC)}{(\text{forward} + \text{interpolated}) * (\text{backward} + \text{interpolated})} \qquad (7)$$

This difference DDV, called motion compensation ratio, is computed for each B picture of each group of three pictures IBB or PBB. As it is assumed that there is no more than one scene change for each group, a decision value DVL measuring the probability of such a scene change is determined by adding the absolute values of DDV for the two adjacent B pictures:

$$DVL = \frac{|DDV(1)| + |DDV(2)|}{2} \qquad (8)$$

the numbers 1 and 2 indicating whether the ratio is related to the first or to the second of the two succeeding pictures. The exact position of the scene change with respect to the bidirectionnel pictures can then be determined by looking at the signs of the two ratios
if DDV(1) and DDV(2)>0, the scene change has occurred before the first B picture;

if DDV(1)>0 and DDV(2)<0, the scene change has occurred between the two B pictures;
   if DDV(1) and DDV(2)<0, the scene change has occurred after the two B pictures.

Figure 10:
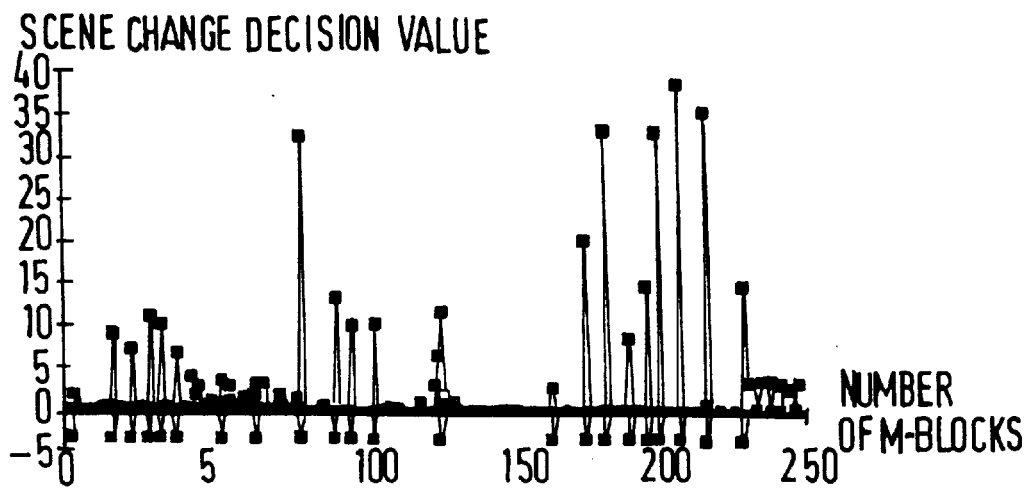
FIG. 10 illustrates the performance of the scene charge detection method using only B pictures.

The performance of the scene change detection method using only B pictures is shown in FIG. 10. One decision value for each IBB or PBB group is computed, and it may be observed that:

the spikes of the decision values are at the same position as the real scene cuts;

the noise around the macroblock n°50 is caused by light effects in the sequence, which disturb the motion estimation algorithm and therefore the motion compensation dependent scene cut prediction;

the last part of the examined video sequence is basically a standing image (the pictures are almost identical): it is therefore undefined which motion compensation is used, since the reference macroblock is the same for all compensation types, and the decision values have consequently a non-negligible value although no scene change occurs (to reduce this risk of wrong scene change predictions, it can then be useful to consider the motion vectors statistics of P pictures in addition to that of B pictures: if the detection coefficient for a P picture is low, no scene change has occurred for the three preceding pictures).

The second sub-step 120 is a GOP allocation sub-step. An optimal allocation of a GOP is determined by two conflicting aims:

(a) the first one is to select a preferred size for the GOP: if a GOP is too small, bits are wasted because more costly I pictures are allocated than necessary, while random access is impaired if a GOP is too big;

(b) the second one is to match the start picture of a GOP with the position of a scene change.

Hence the problem of GOP allocation is to arrange the GOPs in an optimal way while meeting the constraints (a) and (b) (i.e. to start a new GOP at the beginning of a new scene, a maximum and a minimum size of said GOP being respected). In order to solve this optimization problem, a Viterbi algorithm is used: for each path the diversion from the preferred size of the GOP is penalized whereas the inclusion of a probable scene change at the start of a GOP is rewarded, the cumulative sum of all decision values determining the path which is chosen for each picture.

This algorithm finds the optimal start positions of the GOPs over the sequence. Every picture has an attached scene change decision value which describes the probability of a scene cut at the respective position: if the decision value is big, it means that there is a high probability for a scene change at that position, and it is therefore profitable to allocate a new GOP. However, as the size of the GOPs have to be neither too small or too big, the transitions between the GOP start points (i.e. the size of the GOPs) are also weighted.

In FIG. 11, the vertical lines represent pictures, the parameters $S_i$ describe the scene change probabilities of the respective picture (it is assumed that only one scene change occurs for a group of three pictures, hence only one decision value $D_i(N)$ will exist for each PBB or IBB block), and the W parameters are the weighting values which evaluate the size of the GOP (sizes close to an optimum size, such as 12, being preferred). The decision value of a path which ends at picture is then computed as follows:

$$D_i(N) = C_{i-N} + W(N) \quad (9)$$

with N being the size of the considered GOP and $C_{i-N}$ being the sum of all weights S and W for the optimum allocation of GOPs from picture "1" up to picture "i−N". The GOP size is chosen which has the highest decision value. The weighting function W=f(N) is a quadratic one, and W therefore decreases proportionally with the squared difference between the GOP size and the preferred GOP size, such as indicated in FIG. 12 illustrating an example of weighting function for the GOP size (the proposed weight function causes all GOPs between two scene changes to have approximately the same size: hence, if two scene changes have a distance of 16 pictures, two GOPs with a size of 8 are allocated rather than one GOP with the size of 10 and another with the size of 6).

Up to now, it has however not be considered that there is a difference between the transmission order and the display order of pictures. If one considers that the start of GOP is allocated at the first picture after a scene change, then the first group of M pictures in the GOP starts at the scene cut, too. However, the I picture is the last picture of the block to be displayed. If M=3, the first two pictures of the GOP are coded as B pictures and only the third one is an I picture. Therefore the start of the GOPs can be shifted by one or two positions to the left in order to guarantee that the first picture after a scene change is really an I picture and not a B one.

The third sub-step 130 is a P and B picture allocation sub-step. In view of an optimization of the time-dependent parameter M, to search in an adaptive manner for the best place of B and P pictures indeed allows a minimization of the bitrate needed for the coding of the sequence. Increasing the value of M increases the bitrate of P pictures, but more bitrate efficient B pictures are used instead of P pictures. The correlation between succeeding pictures is therefore the most important parameter for the optimization, which will be in fact subdivided into two sub-tasks:

(a) a long-term optimization, in order to find the optimum M over several GOPs (b) a short-term optimization, in order to find the best place of B and P pictures inside a GOP while taking into account the local variations of the correlation between pictures.

With respect to the long-term optimization, it must be noted that, if the correlation coefficient between successive pictures tends toward one, it does not matter whether a B picture or a P picture is chosen since almost no coefficient bits remain in any case, while motion compensation does not work if said correlation is very low. In these extreme cases (respectively a standing image and uncorrelated pictures), it is not obvious which M is to be preferred. In the other cases, it is generally possible to say that a small M performs well for a low correlated sequence and that a big M is better for a sequence with high correlation. The best results for the long-term optimization of M are obtained if experiments are performed over a large number of scenes.

With respect to the short-term optimization, it may be added that M can arbitrarily vary inside each GOP, which makes it possible to use short-term variations of the correlation between pictures in order to minimize the bitrate. An example for short-term optimization of M is given in the following table, indicating the choice of M before a scene change:

| SCENE 1 | | | | SCENE 2 |
| --- | --- | --- | --- | --- |
| POSITION | 1 | 2 | 3 | 4 |
| M = 1 | P | P | P | I |
| M = 2 | P | P | B (like P) | I |
| M = 3 | P | B (like P) | B | I |

Obviously, the B pictures before the scene change can only be forward predicted. It does not make a big difference whether M=1 or 2 before the new scene, because the B picture before the scene change behaves like a P picture; a choice of M=3 is clearly worse because the B picture at position 3 uses a reference picture (the preceding P picture) at position 1, hence at a distance of two positions. Since the correlation between pictures decreases as their distance from each other increases, the bitrate of the B picture at position 3 is higher for M=3 than the bitrates of the pictures at the same position for M=1 or 2.

The third step 43 is a prediction one, intended to predict the quantization stepsize Q which must be used to code the bitstream according to the specific target bitrate. Once said prediction step is completed, the analysis step 41 may be repeated (arrow in FIG. 4) as often as necessary in order to get a more precise estimation for Q (however, a good prediction is generally obtained after a few runs, for instance two).

As the quantization stepsize Q available at the end of this second step is only an estimated value, the total bit budget is not exactly matched if every picture is coded by using said predicted value. A final step 44 is provided that allows to guarantee that the constraint on the total average bit rate is strictly observed. To ensure that the final output bitstream has indeed exactly the desired size, a quantization stepsize control process is implemented. This process is based on a control loop relying on a comparison of predicted and real bit rates. After the coding of each picture in the final step, the control process compares the total number of bits that have been spent with the allowed one. If more bits have been spent than the budget allows, the quantization stepsize is increased, and the bit rate of the following pictures is reduced. If fewer bits have been spent than the budget allows, Q is decreased and the bit rate is increased, the total target bit rate being finally exactly matched.

Said VBR coding method may be implemented in a coder having an architecture such as shown in FIG. 5, where each block corresponds to a particular function that is performed under the supervision of a controller 55. The illustrated coder comprises in series an input buffer 51, a subtractor 549, a DCT circuit 521, a quantization circuit 522, a variable length coding circuit 523, and an output buffer 524. The circuits 521 to 524 constitute the main elements of a coding branch 52, to which a prediction branch 53, including an inverse quantization circuit 531, an inverse DCT circuit 532 and a prediction sub-system, is associated. This prediction sub-system itself comprises an adder 541, a buffer 542, a motion estimation circuit 543 (said estimation is based on an analysis of the input signals available at the output of the buffer 51), a motion compensation circuit 544 (the output signals of which are sent backwards to the second input of the adder 541), and the subtracter 549 (receiving the output signals of the buffer 51 and the output signals of the motion compensation circuit 544, for sending the difference of said signals towards the coding branch).

The output of the illustrated coder is sent towards the controller 55 that includes the control loop provided to carry out the final step 44. The main elements of said control loop for the final pass of the VBR coder are shown in FIG. 13. As already explained, it is necessary to adjust the quantization stepsize during this final coding pass, in order to ensure that the total target bit rate given by the operator is exactly matched. Said loop first comprises a first computation circuit 131 in which the output of the loop (i.e. the cumulative prediction error) is multiplied by a factor KP. This factor is itself equal to a constant $QC_1$ (chosen by the operator) multiplied by a weighting factor $Q_{int}$/APG, where $Q_{int}$ is an integrative estimation of Q and APG the total number of bits for a GOP (of N pictures).

An adder 133 then adds the output Q.prop of said circuit 131 and the signal $Q_{int}$, available at the output of a second computation circuit 132 provided for yielding an integrative estimation of Q. A conversion circuit 134 gives the cumulative bitrate for all preceding pictures, on the basis of a relation $R=f_1(Q)$ (between the quantization factor Q at the output of the adder 63 and the bitrate R) stored in said circuit 134. The cumulative bitrate thus obtained is compared in a comparator 135 with the cumulative predicted bitrate available on a second input of said comparator and is used, after an integration in a circuit 136, in order to modify Q accordingly.

The VBR coding strategy as presented above is an improvement with respect to previous VBR coders because it achieves a better equalization of the perceptive quality of the decoded sequence. The classical VBR coders adjust the quantization parameter Q while coding a picture, so that the predicted bit rate is matched for every picture. Hence they allow the quantization parameter Q to vary inside a picture, and no constant spatial quality of the picture can be achieved. This variation in quality occurs whether the bit rate of the picture is correctly predicted or not. For the proposed VBR coder, Q is kept constant over a picture and the spatial quality of any picture in the video sequence does not vary. If the picture bit rates and the quantization stepwidth are correctly estimated, the Q before adaptive quantization, and therewith the subjective distortion, remains exactly constant for all macroblocks of the sequence. Since the quantization stepwidth and the picture bit rates are only estimated, a variation of Q, and hence of the quality of the sequence, occurs from picture to picture, but, after some analysis passes, the deviations of Q, averaged over a picture, are generally below 1%.

Apart from the attainment of a constant intra-picture quality, several other important aspects of the new VBR strategy may be mentioned:

it is possible to improve the prediction of the quantization factor in an iterative way by increasing the number of analysis passes: if, after the analysis run, the deviation from the wanted target bit rate is still too high, a better estimation for the quantization factor can be calculated using the results from the previous coding passes;

as the new VBR coding strategy predicts Q, analysis passes that are performed with another picture order than the predicted pass can be exploited: this is impossible using old strategies, and this is a major advantage of the new coding concept;

if, in the final pass, the variations of Q and consequently of the quality turn out to be unacceptably high, the final step can be used as an analysis pass for the prediction of Q and of the bitrate for the subsequent pass: using this feature, it is possible to develop a coder that performs as many coding passes as needed until the characteristics of the output bitstream are within certain limits defined by the operator;

as the control loop has an integrative character, short-term bit rate prediction errors cancel each other out: therefore, systematic, picture-type dependent prediction errors do not seriously affect the performance of the proposed VBR coder.

The invention is obviously not limited to the embodiment described hereinbefore, from which variations or improvements may be conceived without departing from the scope of said invention. For instance, an optional fourth sub-step, referenced 140 in FIG. 4 and shown with connections in dotted lines, may be included into the re-ordering step 42, as now explained. In order to code a sequence exactly at a given bitrate R(t) in the final pass of the last step 44, it is indeed necessary to predict a target quantization stepwidth Q and the target picture bitrates R(i). For the execution of an analysis pass, the only requirement is to have a prediction of Q. As no control system for Q is used during the first analysis step 41, no prediction of the picture targets is necessary. For the estimation of the bitrates R(i) and the stepwidth Q, the quantization factor and the picture bitrates of the previous coding pass are needed. However, if the order of the picture types is changed between the two passes, the same picture of a sequence may be coded by two different picture types in said two passes.

If one considers for example that the analysis pass was performed using N=12 and M=3, whereas the predicted pass is coded with N=8 and M=2, the corresponding picture allocations are shown in the following table:

| N  | M | Picture display order |
|----|---|----------------------|
| 12 | 3 | B B I B B P B B P B B P B B I B |
| 8  | 2 | B I B P B P B P B I B P B B B P | where the second picture is coded as a B picture in the first pass and as an I picture in the second pass. As the bitrate prediction is provided for predicting the target bitrate of a picture which has the same type as the picture in the first analysis pass, if a picture was coded as a B picture in said first pass, the bitrate of a B picture is hence predicted for the second pass. In case of a modified picture order, the predicted picture bitrates are therefore useless.

As the prediction of the target picture bitrates is not possible after a picture re-arrangement, the final coding pass cannot be performed directly after the picture re-ordering. A second analysis pass must therefore be carried out before said final coding pass: hence at least three coding passes are needed in that case for the VBR coder according to the invention. In order to guarantee that the predicted picture bitrates for the final pass are not too wrong, an "inter-picture" prediction additional sub-step may therefore be provided, which estimates the bitrates that the pictures would have if the analysis pass had been performed with the new picture order instead of the old one. This additional sub-step 140, which is, as already said, optional, exploits the temporal correlation of picture bitrates.

What is claimed is:

1. A variable bitrate video coding method comprising the steps of a first analysis step, for coding a bitstream corresponding to a picture sequence with a constant quantization stepsize, a second prediction step, for predicting the quantization stepsize which is used to code said bitstream according to a predetermined target bit rate, and a final control step, for adjusting the stepsize with respect to said target bit rate, said method including between the analysis and prediction steps of one iteration, a picture re-arrangement step for rearranging an order of the picture sequence.

2. A method according to claim 1, wherein said picture re-arrangement step includes a first scene change detection sub-step, a second allocation sub-step, and a third optimum placement sub-step.

3. A method according to claim 2, wherein said scene change detection sub-step includes a correlation operation, carried out between succeeding pictures of the sequence, and a decision operation, for indicating the possible occurrence of a scene change.

4. A method according to claim 3, wherein said correlation operation is based on a picture complexity estimation.

5. A method according to claim 3, wherein said correlation operation is based on a comparison of blocks of a picture with reference blocks in a previous reference picture.

6. A method according to claim 2, further including an inter-picture prediction step is provided in case of change of an order of the picture types between two successive iterations.

7. A variable bit rate video coder comprising a first coding branch, a prediction branch, and a control circuit provided for carrying out the implementation of the following operations:

a coding operation of a bitstream corresponding to a picture sequence, with a constant quantization stepsize;

a prediction operation, for an estimation of the quantization stepsize allowing to code said bitstream according to a specified target bitrate;

at least one repetition of said coding and prediction operations;

a final controlling operation, for adjusting the stepsize with respect to said target bitrate;

wherein said control circuit is provided for implementing, between the coding operation and the prediction operation, a picture re-arrangement operation for rearranging an order of the picture sequence.

* * * * *